United States Patent
Yoshinori et al.

[11] Patent Number: 6,020,991
[45] Date of Patent: Feb. 1, 2000

[54] OPTICAL AMPLIFIER

[75] Inventors: Mimura Yoshinori; Yukio Noda; Tetsuya Nakai; Toshio Tani; Tomomi Sudo; Shunichi Ohno, all of Tokyo, Japan

[73] Assignee: KDD Corporation, Japan

[21] Appl. No.: 09/140,708

[22] Filed: Aug. 26, 1998

[30] Foreign Application Priority Data

Sep. 8, 1997 [JP] Japan .................................. 9-242456

[51] Int. Cl.$^7$ ..................................................... H01S 3/091
[52] U.S. Cl. ............................................. 359/341; 359/346
[58] Field of Search ................................... 359/341, 346; 372/70

[56] References Cited

U.S. PATENT DOCUMENTS

| | | | |
|---|---|---|---|
| 5,323,404 | 6/1994 | Grubb | 372/6 |
| 5,327,282 | 7/1994 | Takeda et al. | 359/341 |
| 5,778,014 | 7/1998 | Islam | 372/6 |
| 5,892,781 | 4/1999 | Pan et al. | 372/6 |

*Primary Examiner*—Mark Hellner
*Attorney, Agent, or Firm*—Christie, Parker & Hale, LLP

[57] ABSTRACT

A 1.3 $\mu$m-band optical amplifier includes an optical amplifying fiber doped with Yb ion for emitting light in 1.02 $\mu$m band by pumping of the 0.98 $\mu$m band light and Pr ion for amplifying signal light by pumping of the 1.02 $\mu$m band light. Both ends of the optical amplifying fiber are connected to optical fiber gratings for selectively reflecting 1.02 $\mu$m band light via matching connecting members and tapered core optical fibers. The optical fiber gratings form a 1.02 $\mu$m-band resonator. A Wavelength Division Multiplexing (WDM) optical coupler multiplexes the signal light and pumping light from an pumping laser and supplies the thus-multiplexed light to the optical fiber grating. The pumping laser comprises a laser device which causes laser oscillation at 0.98 $\mu$m. A 1.5 $\mu$m-band optical amplifier having a similar configuration is also disclosed.

8 Claims, 2 Drawing Sheets

OPTICAL AMPLIFIER

FIELD OF THE INVENTION

The present invention relates to an optical amplifier for optically amplifying an optical signal, and more particularly, to an optical amplifier capable of being used in an optical communications system.

BACKGROUND OF THE INVENTION

A waveband used by an optical communications system is generally classified as a 1.3 µm band and a 1.5 µm band. For an optical amplifier for the 1.3 µm band, there has been known a structure in which an optical amplifying fiber doped with Pr (praseodymium) is pumped by a laser beam of a 1.02 µm band. In contrast, for an optical amplifier for the 1.5 µm band, there has been known a structure in which an optical fiber doped with Er (erbium) is pumped by a laser beam of a band ranging from 1.47 to 1.58 µm or a 0.98 µm band.

FIG. 3 shows a block diagram schematically showing the conventional configuration. Reference numeral 50 designates a 2×1 (two inputs/one output) wavelength Division Multiplexing optical coupler. Signal light to be optically amplified enters into one of two input terminals of the optical coupler, and output light from a pumping laser 52 enters into the other input terminal. The optical coupler 50 multiplexes both input signals in wavelength domain, and the thus-multiplexed light enters into an optical amplifying fiber 56 via a matching connecting member 54. The optical amplifying fiber 56 optically amplifies the signal light by means of the pumping light output from the pumping laser 52. The signal light optically amplified by the optical amplifying fiber 56 is supplied to a signal transmission optical fiber 60 via a matching connecting member 58. The matching connecting members 54, 58 are provided for reducing the reflection of light when the core diameter and refractive index of the optical amplifying fiber 56 differ from those of the optical fiber connected to the output terminal of the optical coupler 50 and those of the signal transmission optical fiber 60. Needless to say, if there is no need for such optical matching, the matching connecting members 54, 58 are omitted.

In FIG. 3, the optical amplifying fiber 56 is pumped from the forward end. In contrast, the structure wherein the optical amplifying fiber is pumped from the backward end (more specifically, the pumping laser 52 and the WDM optical coupler 50 are located in a stage subsequent to the optical amplifying fiber 56 in such a way that pumping light travels through the optical amplifying fiber in the direction opposite that in which the signal light travels), and the structure wherein the optical amplifying fiber is pumped from both ends are well known. The latter structure has the advantages that the output power from the respective pumping lasers may be rather small, and that the amplification gain can be made uniform in the longitudinal direction of the optical amplifier.

In the optical amplifier used for the 1.3 µm band, the optical amplifying fiber 56 is an optical fiber doped with Pr (praseodymium) ions, and the pumping laser 52 is a laser which is laser-oscillated in the 1.02 µm band. In the optical amplifier used for the 1.5 µm band, the optical amplifying fiber 56 is an optical fiber doped with Er ions, and the pumping laser 52 is a laser which is laser-oscillated in the 1.58 µm band or the 0.98 µm band. Thus, the optical amplifier for the 1.3 µm band and the optical amplifier for the 1.5 µm band are essentially the same in structure and differ from each other only in material used for doping an optical amplifying medium and a pumping wavelength.

The conventional optical amplifier for the 1.3 µm band provides a small gain. For example, even in the case of both-end pumping, in order to obtain gain of 20 dB, 1.02 µm-band light having a power as high as about 700 mW must be input to a Pr-doped optical fiber from both ends thereof. Accordingly, such an optical amplifier cannot be applied to an actual optical communications system. Further, a 1.02 µm-band laser is considerably special and hence expensive.

In contrast, the conventional optical amplifier for the 1.5 µm band does not present problems such as those mentioned previously. However, pumping light is merely input into an Er-doped optical fiber, and hence light which has not been absorbed by the Er-doped optical fiber is discarded and never used, resulting in inefficient pumping. Further, the intensity of pumping light is greatest at the entrance of an optical amplifying fiber and becomes gradually attenuated as the pumping light travels through the optical amplifying fiber, so that the optical amplification gain decreases and noise increases accordingly. More specifically, there is a problem that the gain varies in the longitudinal direction of the optical amplifying fiber.

SUMMARY OF THE INVENTION

The present invention has been conceived to solve the foregoing drawbacks in the conventional optical amplifiers, and the object of the present invention is to provide an optical amplifier which provides high gain by utilization of an inexpensive pumping light source.

Another object of the present invention is to provide an optical amplifier having a high pumping efficiency.

Still another object of the present invention is to provide an optical amplifier whose gain is made uniform in the longitudinal direction or the direction in which signal light travels.

In the present invention, an optical amplifying medium includes a light-emitting material pumped by first pumping light for emitting second pumping light having a wavelength different from those of the first pumping light and signal light, and an optical amplifying material pumped by the second pumping light for amplifying the signal light; and first and second reflecting means for selectively reflecting the second pumping light are provided such that the optical amplifying medium is sandwiched between them, thereby constituting a resonator for the second pumping light.

Preferably, by selecting material which efficiently absorbs the first pumping light as light-emitting material, the first pumping light can be efficiently utilized. Since the light emitted from the light-emitting material is confined within the resonator by means of the first and second reflecting means, the optical amplifying material can be efficiently pumped. Therefore, the overall pumping efficiency is improved. Further, since the second pumping light trips roundly within the resonator, the amplification gain can be made uniform in a longitudinal direction.

Preferably, by providing light multiplexing means for multiplexing the first pumping light output from the pumping light source and the signal light and supplying the result to the optical amplifying medium, the signal light and the first pumping light can be efficiently applied to the optical amplifying medium. Since the light multiplexing means is disposed outside the resonator formed by the first and second reflecting means, the intensity of the second pumping light can be maintained at a high level within the resonator.

Preferably, by providing that the optical amplifying medium comprises first medium including the light-emitting material and second medium including the optical amplifying material, the optical amplifying medium can be readily manufactured.

Preferably, by forming the first and second reflecting means from grating means, e.g., optical fiber gratings, there can be readily implemented reflecting means which efficiently reflects only the second pumping light.

Preferably, by providing that the light-emitting material is composed of Yb ions; the optical amplifying material is composed of Pr ions; the second pumping light has a wavelength in the 1.02 μm band; and the first pumping light has a wavelength in the 0.98 μm band, an optical amplifier for the 1.3 μm band can be made.

Preferably, providing that the light-emitting material is composed of Tm ions; the optical amplifying material is composed of Er ions; the second pumping light has a wavelength in the 1.47 μm band; and the first pumping light has a wavelength in the 1.06 μm band, an optical amplifier for the 1.5 μm band can be made.

DESCRIPTION OF THE PREFERRED EMBODIMENTS

With reference to the accompanying drawings, preferred embodiments of the present invention will be described in detail.

Figure 1:
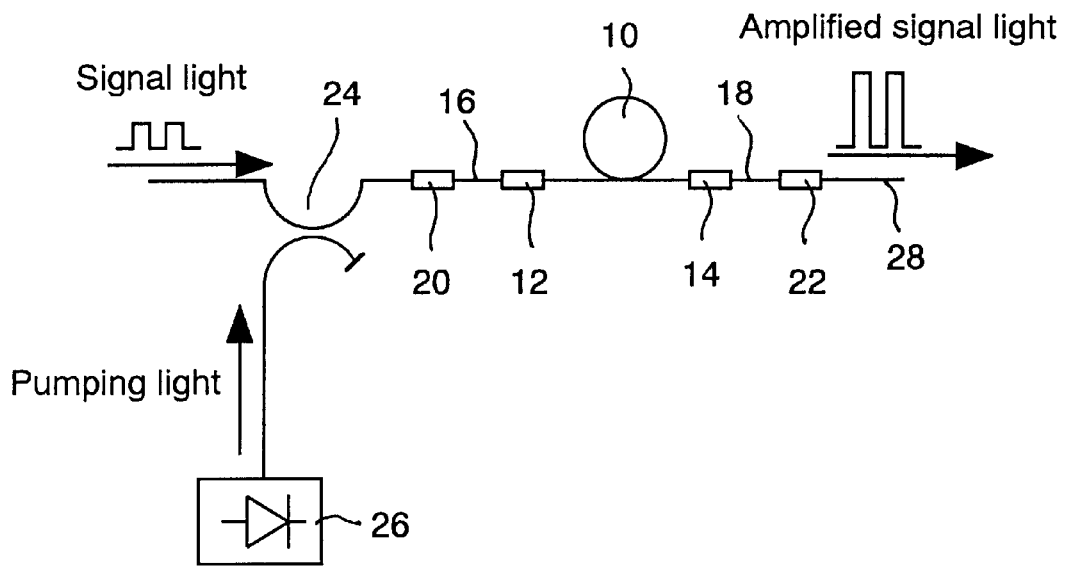
FIG. 1 is a block diagram schematically showing the configuration of an optical amplifier for the 1.3 μm band according to a first embodiment of the present invention.

FIG. 1 is a block diagram schematically showing an optical amplifier for the 1.3 μm band according to one embodiment of the present invention. Reference numeral 10 designates an optical amplifying fiber doped with Pr and Yb ions. Both ends of the optical amplifying fiber 10 are respectively connected to optical fiber gratings 20, 22, which selectively reflect light in the 1.02 μm band, through matching connecting members 12, 14 and tapered core optical fibers 16, 18 whose core diameters are gradually and monotonously changed in the longitudinal direction. The matching connecting members 12, 14 are provided for absorbing a difference of effective refractive indices between the optical amplifying fiber 10 and the tapered core optical fibers 16, 18. The tapered core optical fibers 16, 18 are provided for absorbing a difference of core diameters or mode field diameters between the optical amplifying fiber 10 (or the matching connecting members 12, 14) and the tapered gratings 20, 22. Needless to say, if such matching is not necessary, the matching coupling members 12, 14 and the tapered core optical fibers 16, 18 can be omitted.

Signal light to be optically amplified enters into one of two input terminals of the 2×1 Wavelength Division Multiplexing (WDM) optical coupler 24, and pumping light output from the pumping laser 26 enters into the other input terminal. The WDM coupler 24 multiplexes signal light and pumping light in wavelength domain and supplies the thus-multiplexed optical signal to the optical fiber grating 20. The pumping laser 26 comprises a laser device which causes laser oscillation at 0.98 μm.

A signal transmission optical fiber 28 for outputting optically-amplified signal light is connected to the other end of the optical fiber grating 22.

The operation of the optical amplifier according to the present embodiment will now be described. The WDM optical coupler 24 multiplexes the signal light to be optically amplified and the pumping light of the 0.98 μm band from the pumping laser 26 in a wavelength domain. Since both of the wavelength of the signal light and the wavelength of the pumping light in the wavelength-division multiplexed light output from WDM optical coupler 24 are different from the reflection waveband (e.g., 1.02 μm band) of the optical fiber grating 20, the output light from the WDM optical coupler 24 passes through the optical fiber grating 20 in a substantially lossless manner, transmits through the tapered core optical fiber 16 and the matching coupling member 12 in a substantially lossless manner, as well, and finally enters into the optical amplifying fiber 10.

As mentioned previously, the optical amplifying fiber 10 is doped with Pr and Yb ions. Yb ions have an absorption band at 0.98 μm and emits light in the 1.02 μm band (more specifically, in a waveband ranging from 1.01 to 1.02 μm, but this waveband will be referred to as the 1.02 μm band throughout the specification) as a result of transition of Yb ions from $^4F_{5/2}$ level to $^4F_{7/2}$ level by absorbing pumping light of the 0.98 μm band. Since the 1.02 μm-band light generated here is reflected by the optical fiber gratings 20, 22, the light bounces back and forth within a resonator formed by the optical fiber gratings 20, 22. As a result, considerably intensive light in the 1.02 μm band is present in the resonator, especially in the optical amplifying fiber 10 due to stimulated emission.

The optical amplifying fiber 10 is also doped with Pr ions. Pr ions have an absorption band at 1.02 μm and perform population inversion when being pumped by the 1.02 μm-band light.

When signal light in the 1.3 μm band is input to the optical amplifying fiber 10 in such a state, the 1.3 μm-band signal light is amplified through stimulated emission of light in the 1.3 μm band caused by Pr ions. The thus-amplified signal light is input to the signal transmission optical fiber 28 via the matching coupling member 14 and the tapered core optical fiber 22, and the light is further output to a subsequent stage from the signal transmission optical fiber 28.

In the present embodiment, the resonator is formed by the optical fiber gratings 20, 22, the optical amplifying fiber 10 causes stimulated emission of light in the 1.02 μm band, and thus-emitted light bounces back and forth within the resonator. As a result, very intensive light in the 1.02 μm band can be obtained, and a uniform distribution of optical intensity in the longitudinal direction can be obtained in the resonator, particularly in the optical amplifying fiber 10.

According to the present embodiment, since the 1.02 μm-band light is confined within the resonator formed by the optical fiber gratings 20, 22, a loss of optical energy due to reasons other than pumping of Pr ions is considerably small. Accordingly, Pr ions can be very highly efficiently pumped, and high gain efficiency can be achieved.

According to the present embodiment, a semiconductor laser for the 0.98 μm band, which has already been adopted for an optical amplifier for the 1.55 μm band and is superior in terms of reliability, output power and cost, can be adopted as an pumping light source, enabling an improvement in reliability and a decrease in cost.

Although in the embodiment shown in FIG. 1 the optical fiber gratings 20, 22 are used as elements for selectively reflecting light of a specific wavelength, e.g., the wavelength of light emission of Yb ions, a narrow-band filter may alternatively be used. Further, a fluoride fiber, which includes Zr, Hf, or In as a main component, can also be used as the optical amplifying fiber 10. The present invention is not necessarily limited to this type of medium. Any type of medium may be used, so long as the medium permits Yb and Pr ions to emit sufficiently intensive light. Further, although the pumping light of the 0.98 μm band is input to the optical amplifying fiber 10 from the forward end in the embodiment shown in FIG. 1, it is obvious that the pumping light may also be input to the optical amplifying fiber from the backward end or from both ends.

Figure 2:
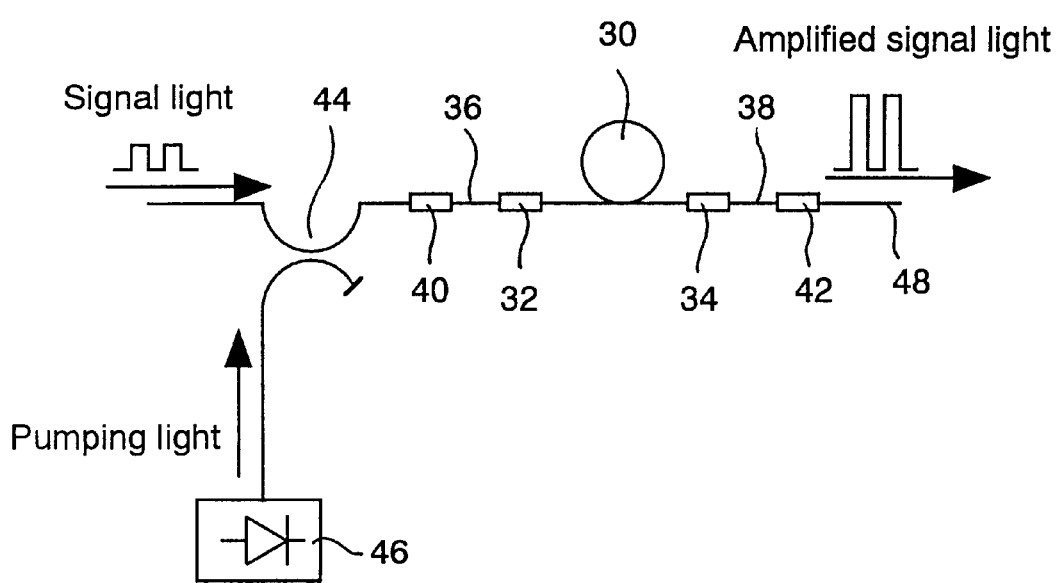
FIG. 2 is a block diagram schematically showing the configuration of an optical amplifier for the 1.5 μm band according to a second embodiment of the present invention.
Figure 3:
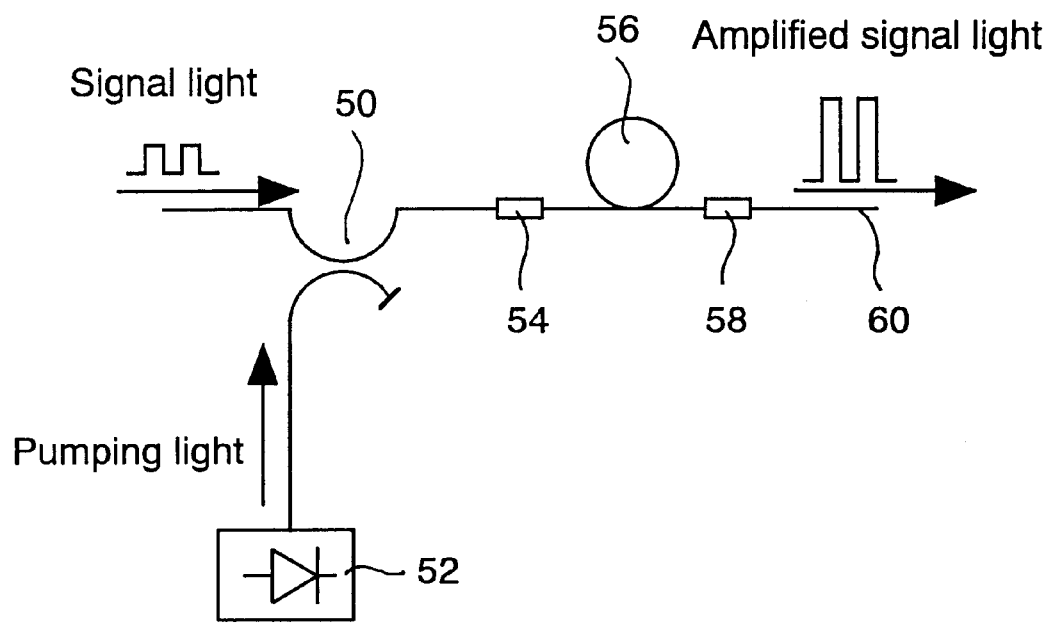
FIG. 3 is a block diagram schematically showing a conventional optical amplifier.

Next, second embodiment of the present invention applied to an optical amplifier for the 1.5 μm band will be described. FIG. 2 is a block diagram schematically showing the configuration of the second embodiment. Reference numeral 30 designates an optical fiber doped with Er and Tm ions; 32, 34 designate matching connecting members; 36, 38 designated tapered core optical fibers; 40, 42 designate optical fiber gratings which selectively reflect the 1.47 μm-band light; 44 designates a WDM optical coupler for multiplexing the signal light to be amplified with pumping light of the 1.06 μm band from the pumping laser 46; and 48 designates a signal transmission optical fiber for outputting the amplified signal light. The members 30 to 48 correspond to the members 10 to 28 used in the first embodiment shown in FIG. 1 and are arranged in the same manner as the members 10 to 28.

As same as the case with the first embodiment, the matching connecting members 32, 34 are provided for absorbing a difference of effective refractive indices between the optical amplifying fiber 30 and the tapered core optical fibers 36, 38 and the tapered core optical fibers 36, 38 are provided for absorbing a difference of core diameters or mode field diameters between the optical fiber gratings 40, 42 and the optical amplifying fiber 30 (or the matching connecting members 32, 34). If the foregoing matching operations are unnecessary, the matching connecting members 32, 34 and the tapered core optical fibers 36, 38 can be omitted.

As mentioned previously, according to the second embodiment, the composition of the optical amplifying fiber 30, the reflection wavelength of the optical fiber gratings 40, 42, and the oscillation wavelength of the pumping laser 46 are different from those of the corresponding elements used in the first embodiment shown in FIG. 1.

The operation of the embodiment shown in FIG. 2 will be described. The WDM optical coupler 44 multiplexes signal light to be optically amplified with the pumping light of the 1.06 μm band output from the pumping laser 46 in wavelength domain. Since both of the wavelengths of signal light and the pumping light in the wavelength-division multiplexed light output from the WDM optical coupler 44 are different from the reflection waveband (e.g., 1.47 μm band) of the optical fiber grating 40, the output light from the WDM optical coupler 44 passes through the optical fiber grating 40 in substantially a lossless manner, transmits through the tapered core optical fiber 36 and the matching connecting member 32 in a substantially lossless manner, as well, and finally enters into the optical amplifying fiber 30.

As mentioned previously, the optical amplifying fiber 30 is doped with Er and Tm ions. Tm ions have an absorption band at 1.06 μm and emits light in the 1.47 μm band as a result of transition of Tm ions from $^3F_4$ level to $^3H_4$ level by absorbing the pumping light of the 1.06 μm band. Since the 1.47 μm-band light generated here is reflected by the optical fiber gratings 40, 42, the light bounces back and forth within a resonator formed by the optical fiber gratings 40, 42. As a result, considerably intensive light in the 1.47 μm band is present in the optical amplifying fiber 30 due to stimulated emission.

The Er ions used for doping the optical amplifying fiber 30 have an absorption band at 1.47 μm and perform population inversion when being pumped by the 1.47 μm-band light.

When signal light in the 1.5 μm band is input to the optical amplifying fiber 30 in such a state, the 1.5 μm-band signal light is amplified through stimulated emission of light in the 1.5 μm band caused by Er ions. The thus-amplified signal light is input to the signal transmission optical fiber 48 via the matching connecting member 34 and the tapered core optical fiber 42, and the light is further output to a subsequent stage from the signal transmission optical fiber 48.

In the second embodiment, the resonator is formed by the optical fiber gratings 40, 42, the optical amplifying fiber 30 causes stimulated emission of the 1.47 μm-band light, and thus-emitted light bounces back and forth within the resonator. As a result, very intensive light in the 1.47 μm band can be obtained, and Er ions within the optical amplifying fiber 30 can be pumped very efficiently. Further, since the 1.47 μm-band light existing in the optical amplifying fiber 30 has a uniform density in its longitudinal direction, amplification gain for the 1.5 μm band also becomes uniform in the longitudinal direction.

According to the second embodiment, since the 1.47 μm-band light is confined within the resonator formed by the optical fiber gratings 40, 42, a loss of optical energy due to reasons other than pumping of Er ions is considerably small. Accordingly, Er ions can be very highly efficiently pumped, and high gain efficiency can be achieved.

Although in the embodiment shown in FIG. 2 the optical fiber gratings 40, 42 are used as elements for selectively reflecting light of a specific wavelength, e.g., the wavelength of light emission of Tm ions, a narrow-band filter may alternatively be used. Further, a fluoride fiber, which includes Zr, Hf, or In as a main component, can also be used as the optical amplifying fiber 30. The present invention is not necessarily limited to this type of medium. Any type of medium may be used, so long as the medium permits Er and Tm ions to emit sufficiently intensive light. A compact semiconductor-pumped Nd:YAG laser or Nd-doped fiber laser can be used as the pumping light source of the 1.06 μm band. Further, although the light emission wavelength of Tm ions is described as being in the 1.47 μm band for brevity in the foregoing description, an actual light emission wavelength of Tm ions ranges from 1.46 to 1.48 μm, and light within this band can be obviously used for pumping Er ions. Still further, although the pumping light of the 1.06 μm band is input to the optical amplifying fiber 30 from the forward end in the embodiment shown in FIG. 2, it is obvious that the pumping light may also be input to the optical amplifying fiber from the backward end or from both ends.

Although the optical amplifying fibers 10 and 30 are doped with a mixture of two types of materials in the previous embodiments, each of the optical amplifying fibers 10 and 30 may be formed by combining two different optical fibers, that is, first optical fiber doped with first material of Yb or Tm which emits light having an intermediate wavelength when being pumped by pumping light and second optical fiber doped with second material of Pr or Er which amplifies signal light when being pumped by the light of the intermediate wavelength. Further, such optical fibers which are respectively doped with different dopant may be located alternately.

Although the previous embodiments have employed a two-step configuration in which light is produced at an intermediate wavelength, using external pumping light and signal light amplifying material is pumped by the light of intermediate wavelength, a multistep configuration in which light is produced at a plurality of different intermediate wavelengths can also be implemented by providing the reflecting elements corresponding to the respective intermediate wavelengths.

Although the descriptions have explained the optical amplifiers for the 1.3 μm band and the 1.5 μm band in the previous embodiments, an optical amplifier for another wavelength band can also be implemented by properly selecting light-emitting material for emitting light at an intermediate wavelength and signal light amplifying material for amplifying signal light with the light of the intermediate wavelength.

As can be readily understood from the foregoing descriptions, the present invention enables implementation of an inexpensive, highly-reliable, and highly-efficient optical amplifier. Since light having an intermediate wavelength is produced, the range of selection of wavelength for an pumping light source is increased. Further, since light of intermediate wavelength is confined within a resonator, the signal light amplifying substance can be highly efficiently pumped, and the amplification gain can be made uniform in the longitudinal direction.

Furthermore, it will be apparent to those skilled in the art that various changes and modifications can be made to these specific embodiments without departing from the spirit and scope of the invention as defined in the claims.

We claim:

1. An optical amplifier for amplifying signal light, comprising:

a pumping light source for generating first pumping light;

an optical amplifying medium including a light-emitting material pumped by said first pumping light for emitting second pumping light having a wavelength different from a wavelength of said first pumping light and said signal light, and an optical amplifying material pumped by said second pumping light for amplifying said signal light; and first and second reflecting members for selectively reflecting said second pumping light disposed on each side of said optical amplifying medium, thereby constituting a resonator.

2. The optical amplifier as defined in claim 1 further comprising multiplexing means for multiplexing said first pumping light from said pumping light source and said signal light, and supplying such multiplexed light to said optical amplifying medium.

3. The optical amplifier as defined in claim 2 wherein said multiplexing means is disposed outside said resonator, and at least one of said first and second reflecting members transmit the wavelength of said first pumping light.

4. The optical amplifier as defined in claim 1 wherein said optical amplifying medium comprises a first medium including said light-emitting material and a second medium including said optical amplifying material.

5. The optical amplifier as defined in claim 1 wherein said optical amplifying medium comprises a fluoride fiber having a component selected from the group consisting of Zr, Hf, and In.

6. The optical amplifier as defined in claim 1 wherein said first and second reflecting members each comprise grating members.

7. The optical amplifier as defined in any one of claims 1 through 6 wherein said light-emitting material comprises Yb ions, said optical amplifying material comprises Pr ions, said second pumping light has a wavelength approximately in the 1.02 μm band, said first pumping light has a wavelength approximately in the 0.98 μm band, and said signal light has a wavelength approximately in the 1.3 μm band.

8. The optical amplifier as defined in any one of claims 1 through 6 wherein said light-emitting material comprises Tm ions, said optical amplifying material comprises Er ions, said second pumping light has a wavelength approximately in the 1.47 μm band, said first pumping light has a wavelength approximately in the 1.06 μm band, and said signal light has a wavelength approximately in the 1.5 μm band.

* * * * *

UNITED STATES PATENT AND TRADEMARK OFFICE
CERTIFICATE OF CORRECTION

PATENT NO. : 6,020,991  
DATED : February 1, 2000  
INVENTOR(S) : Minura Yoshinori; Yukio Noda; Tetsugy Nakai; Toshio Tani; Tomomi Sudo; Shunichi Ohno Page 1 of 1

It is certified that error appears in the above-identified patent and that said Letters Patent is hereby corrected as shown below:

<u>Title page,</u>  
Item [73], The assignee should read:  
KDD Corporation and Furuuchi Chemical Corporation, Tokyo, Japan.

Signed and Sealed this

Twentieth Day of November, 2001

*Attest:*

NICHOLAS P. GODICI  
*Attesting Officer*     *Acting Director of the United States Patent and Trademark Office*